United States Patent [19]
Simard

[11] Patent Number: 5,394,109
[45] Date of Patent: Feb. 28, 1995

[54] DIGITAL FSK DEMODULATOR WITH OFFSET CANCELLATION

[75] Inventor: Frédéric J. M. A. Simard, Hull, Canada

[73] Assignee: Northern Telecom Limited, Montreal, Canada

[21] Appl. No.: 197,912

[22] Filed: Feb. 17, 1994

[51] Int. Cl.[6] .................................... H04L 27/14
[52] U.S. Cl. .................... 329/300; 375/317; 375/324; 375/334
[58] Field of Search .............. 329/300, 301, 302, 303; 375/80, 82, 88, 76

[56] References Cited

U.S. PATENT DOCUMENTS 5,053,717 10/1991 Schulz et al. ................. 329/300
5,155,446 10/1992 Eberle et al. ................. 329/300

*Primary Examiner*—Siegfried H. Grimm
*Attorney, Agent, or Firm*—Yoshiharu Toyooka

[57] ABSTRACT

A digital FSK demodulator includes a quadrature phase detector for detecting space and mark tones used in FSK signals. Due to its inherent characteristics, a telephone loop in which the demodulator is used produces unequal amplitudes in detected mark and space tones. The inequality or offset must be cancelled so that a proper timing signal can be recovered from the FSK signal. The demodulator includes a digital compensation circuit for off-hook and on-hook offset cancellation.

5 Claims, 3 Drawing Sheets

DIGITAL FSK DEMODULATOR WITH OFFSET CANCELLATION

FIELD OF THE INVENTION

The present invention relates to a digital demodulator for FSK signals transmitted in voiceband. More specifically, the demodulator uses a quadrature phase detector and includes a feature which allows compensation of signal offset.

BACKGROUND OF THE INVENTION

FSK (frequency shift keying) is one of many modulation techniques widely used for digital data transmission. Often MODEMS are used to connect computers or other digital equipment over a transmission medium, such as a telephone loop, coaxial cable, fiber optics, electromagnetic waves etc. Voiceband FSK is used over telephone loops to transmit data between customers' premises equipment (CPE) and a switching office for local area signaling services. In this transmission, FSK signals are sent on mark and space tones whose frequencies are, for example, 1200 and 2200 Hz respectively and therefore lie in the voiceband. The FSK signals can be sent over a telephone loop while a customer's terminal, e.g. a telephone set, is either off-hook or on-hook. One popular use of FSK signals in the telephone environment is to display the telephone number of an incoming call on the customer's telephone set. Numerous other uses have been devised and can be conceived in the future for this data transmission between CPE and switching office.

A digital FSK demodulator using a quadrature phase detector is described in U.S. Pat. No. 5,155,446 (Eberle et al), issued on Oct. 13, 1992. The demodulator of this patent comprises a highpass filter, a quadrature phase detector, and a lowpass filter. The demodulated output of the lowpass filter is fed to a UART (asynchronous receiver) for data recovery. This demodulator uses mainly a collection of shift registers for the filters and one multiplier for the quadrature phase detector. It is therefore very easy and economical to manufacture in a small IC chip. Generally speaking, the sampling rate is four times the average of the signaling tones. In the embodiment discussed in the patent, the mean value of the two signaling tones is 1700 Hz; therefore the sampling rate of the modulated signal is 6800 Hz. Assuming that the amplitude of each received tone is unity (an unrealistic assumption in practice), the sampling rate is set at 6800 Hz, the DC gain of the lowpass filter is 0 dB, and the lowpass filter completely eliminates the harmonic component in the quadrature demodulator output (the last also being unrealistic), the output of the quadrature demodulator would be as shown in the table below.

| Signaling Frequency (Hz) | Normalized Radian Frequency $\omega$ (rad/s) | Corresponding Quadrature Output After Lowpass Filtering |
| --- | --- | --- |
| 1200 | 1.108797 | 0.2228692 |
| 2200 | 2.032795 | −0.2228692 |

The positive value at the output of the quadrature demodulator (after lowpass filtering) corresponds to the mark frequency (1200 Hz), while the negative value corresponds to the space frequency (2200 Hz). However, because certain assumptions are unrealistic, it is necessary to consider the effect of non-ideal conditions. The levels of the received signaling tones are not equal due to many factors, a few of which are mentioned below.

MODEM Transmission
   The MODEM may not necessarily transmit the tones at equal level.

Loop
   The loop attenuates the space tone more than the mark tone.

External Highpass Filtering
   Provided to attenuate 60 Hz noise, this filter attenuates the mark tone more than the space tone.

$Sinc^2$ Decimation Filter
   This filter has a lowpass characteristic attenuating the space tone more than the mark tone.

Digital Highpass Filtering
   Like its external counterpart, this filter attenuates the mark frequency more than the space frequency.

As a result of the inequality in the amplitude of the received signaling tones, the quadrature outputs generated by each signaling tone no longer sum to zero, thereby creating an offset in the demodulator output. Since the zero crossings of the demodulator output determine the timing recovery in the asynchronous receiver, it is imperative that this offset be eliminated.

OBJECTS OF THE INVENTION

It is therefore an object of the present invention to provide a digital FSK demodulator which includes an offset cancellation feature.

It is another object of the present invention to provide a digital FSK demodulator which uses quadrature phase detection with an offset cancellation feature.

It is a further object of the present invention to provide a digital FSK demodulator which performs offset cancellation in on-hook and off-hook transmissions.

SUMMARY OF THE INVENTION

Briefly stated, the present invention is directed to a digital FSK demodulator for an FSK signal which is made up of mark and space tones. According to one aspect of the invention, the FSK demodulator comprises a quadrature demodulator for digitally detecting the FSK signal to generate a detected FSK signal, and an offset estimate means for digitally detecting the FSK signal to generate an offset signal indicative of an offset in the detected FSK signal. The FSK demodulator further includes means for applying the offset signal to the quadrature demodulator to compensate the offset in the detected FSK signal.

According to another aspect of the present invention, the FSK signal is composed of a message signal and an alert signal, the alert signal consisting of a substantial number of continuous bits of mark tone and preceding the message signal. The quadrature demodulator for digitally detecting the FSK signal includes a highpass filter, a quadrature phase detector and a lowpass filter. The offset estimate means comprises an amplitude measuring means for measuring the amplitude of the alert signal.

According to yet another aspect of the present invention, the offset estimate means includes a highpass filter, a quadrature phase detector and a lowpass filter.

BRIEF DESCRIPTION OF THE DRAWINGS

For a more complete understanding of the present invention and for further objects and advantages thereof, reference may now be made to the following description, taken in conjunction with the accompanying drawings, in which.

DETAILED DESCRIPTION OF THE PREFERRED EMBODIMENTS OF THE INVENTION

Figure 1:
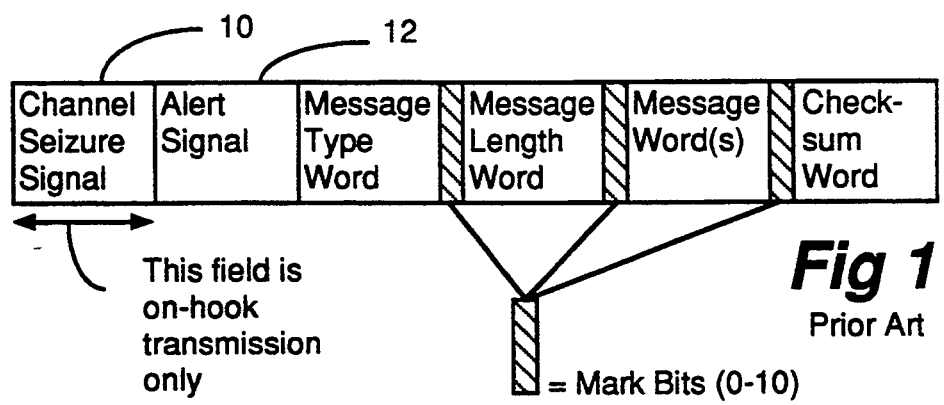
FIG. 1 is an illustration of a message format of digital data being transmitted in FSK.

FIG. 1 illustrates the single data message format of voiceband FSK currently being widely accepted by the industry for custom local area signaling services (CLASS).

Some characteristics of the format are as follows:

Logical 1 (mark) and logical 0 (space) frequencies are nominally 1200 and 2200 Hz respectively.

Data format is serial, binary and asynchronous and the modulation is continuous phase binary frequency shift keying.

Each data word consists of an 8-bit byte; each data word is preceded by a start bit (space) and followed by a stop bit (mark), a total of 10 bits in a word.

The least significant bit of the byte is transmitted first.

The data signal is continuous and may contain up to 10 mark bits between data words.

Transmission of any 8-bit character is supported in the message word.

The channel seizure signal 10 is present during on-hook transmission only. It consists of 300 continuous bits of alternating space and mark, beginning with space and ending with mark.

The alert signal 12 consists of 180 bits (in on-hook transmission) and 80 bits (in off-hook transmission) of continuous mark. It should be noted that in the industry, "alert signal" is more commonly known as "mark signal" but in this specification this term is used to avoid confusion with the mark tone (2200 Hz) which is sometimes called mark signal or mark frequency.

The transmission rate is 1200 Baud.

As mentioned earlier, in practice different signaling tones produce different amplitudes in the received signal and create an offset in the output of a demodulator based upon the quadrature phase detection. Since the zero crossings of the demodulator output determine the timing recovery in the asynchronous receiver, it is important that this offset be canceled.

Figure 2:
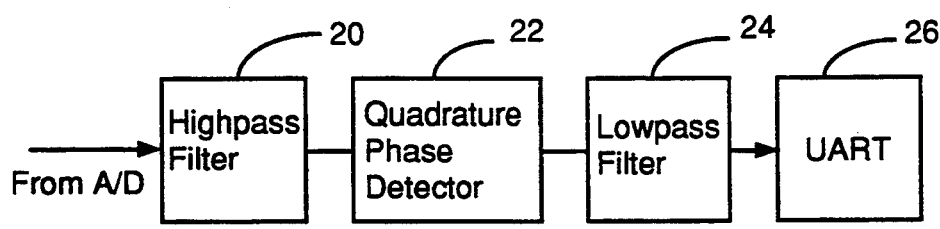
FIG. 2 is a functional block diagram of a digital FSK demodulator according to a prior patent.

FIG. 2 shows the digital demodulator according to the prior patent mentioned above. It comprises a highpass filter 20, a quadrature phase detector 22, and a lowpass filter 24. An analog FSK signal is converted to a digital signal by an A/D converter (not shown) which sends the converted digital signal to the highpass filter 20 as a demodulator input. The highpass filter attenuates 60 Hz power noise from the demodulator input. The quadrature phase detector 22 contains a shift register for delaying a digital input signal by one sample and then multiplies this received digital input y(n) by the previously received (and delayed by one sample) signal y(n−1) to generate a quadrature output. The lowpass filter 24 attenuates harmonics of the signaling frequencies in the quadrature output. The digital filters are made of shift registers and adders. The demodulated output of the lowpass filter is fed to a UART 26 for data decoding and recovery.

Figure 3:
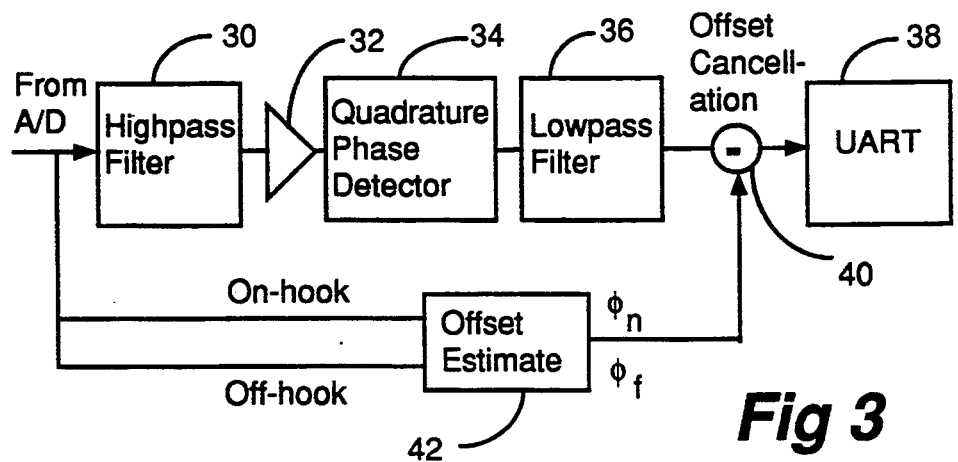
FIG. 3 is a functional block diagram of a digital demodulator with offset cancellation according to one embodiment of the present invention.

FIG. 3 shows a block diagram of the demodulator according to one embodiment of the present invention. The sampling rate in the embodiment is 6800 Hz because, as in the prior patent, the signaling tones are 1200 and 2200 Hz. The demodulator includes a highpass filter 30, a gain adjustment 32, a quadrature phase detector 34, a lowpass filter 36, and an asynchronous receiver (UART) 38. The functions of these elements are the same as those described in the aforementioned patent, except for the gain adjustment which is included to compensate the loss inherent in long subscriber loops. During on-hook transmission, the gain adjustment is implemented by left shifting the highpass filter output by n bits, but during off-hook transmission it is done by left shifting the highpass filter output by n+1 bits. n is determined by measuring the maximum of the rectified highpass filter output during part of on-hook transmission. The demodulator further includes an offset cancellation block 40 which is a subtractor (or a negative adder) to subtract an offset signal from a lowpass filter output. An offset estimate block 42 produces the offset signal which is either an on-hook or off-hook offset signal, depending on the transmission. The offset estimate block 42 contains an on-hook offset estimation circuit and off-hook offset estimation circuit, both of which will be described in more detail below. As will be described below, however, substantial components are common to both the on-hook and off-hook offset estimation circuit and different software runs the same components to function as the on-hook or off-hook estimate circuit.

Offset Estimation

In general, the offset $\phi$ at the output of the lowpass filter may be approximated by the following expression:

$$\phi \approx K \frac{\cos\omega}{4} (A_1^2 - A_0^2)$$

where K is the product of DC gain and magnitude response at 600 Hz of the lowpass filter after quadrature; $\cos\omega = 0.4457384$ and $A_1$, $A_0$ are respectively the amplitudes of the mark and space signaling tones at the input to the quadrature phase detector. During on-hook FSK transmission, the channel seizure signal will be used to estimate the on-hook offset $\phi_n$, using the above equation, while during off-hook transmission the above expression is slightly modified (weighted) and the alert signal will be used in computing the off-hook offset $\phi_f$.

On-Hook Offset Cancellation

Figure 4:
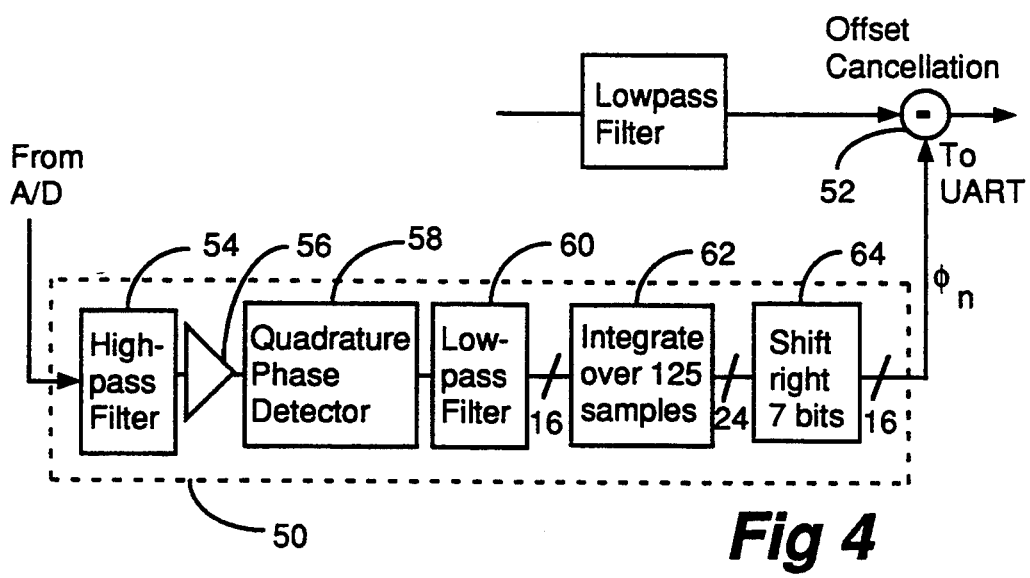
FIG. 4 is a functional block diagram of an on-hook offset estimation circuit according to another embodiment of the invention.

FIG. 4 illustrates functionally an offset cancellation feature which is in effect during on-hook transmission. An on-hook offset estimate block 50 receives the demodulator input and sends the on-hook estimate signal to the offset cancellation block, which is an adder 52. The on-hook offset estimate block 50 includes a highpass filter 54, gain adjustment 56, a quadrature phase detector 58 and a lowpass filter 60, all of which are identical to those contained in the demodulator shown in FIG. 3. In this transmission, the offset is estimated during a channel seizure signal consisting of a 300-bit sequence of alternating mark and space. Summation of the demodulator output over an integral number of mark/space periods yields a good estimate of the offset because the demodulated channel seizure signal should not contain a DC offset. Thus the on-hook offset estimate block 50 includes an integrator 62 to average the lowpass filter output over an integral number of mark-space cycles and a right shifter 64 to divide the sum by the number of summed samples. Generally speaking, division is difficult except by a power of two which is easily implemented by right shifting. In the present embodiment, because the nominal sampling rate is 6800 Hz and the transmission rate is 1200 Baud, each mark-space cycle will require $2*6800/1200=11.33$ samples. Therefore, the integrator 62 integrates 125 samples over 11 cycles which actually correspond to $11.33*11=124.67$ samples. The division can then be adequately approximated by shifting right 7 bits (division by 128) at shifter 64. The integration is performed using 24-bit operation, accumulating 16-bit lowpass filter output samples. When overflow is detected, an 8-bit counter is incremented. After 125 samples have been accumulated, the upper byte of the on-hook offset estimate is the overflow counter, while its lower byte is the upper byte of the accumulated lowpass filter output samples. The estimate is completed by shifting it left by a single bit. The estimated offset signal $\phi_n$ should then be subtracted (negatively added by the adder 52) from the lowpass filter output of the demodulator as shown in FIG. 4.

Off-Hook Offset Cancellation

Figure 5:
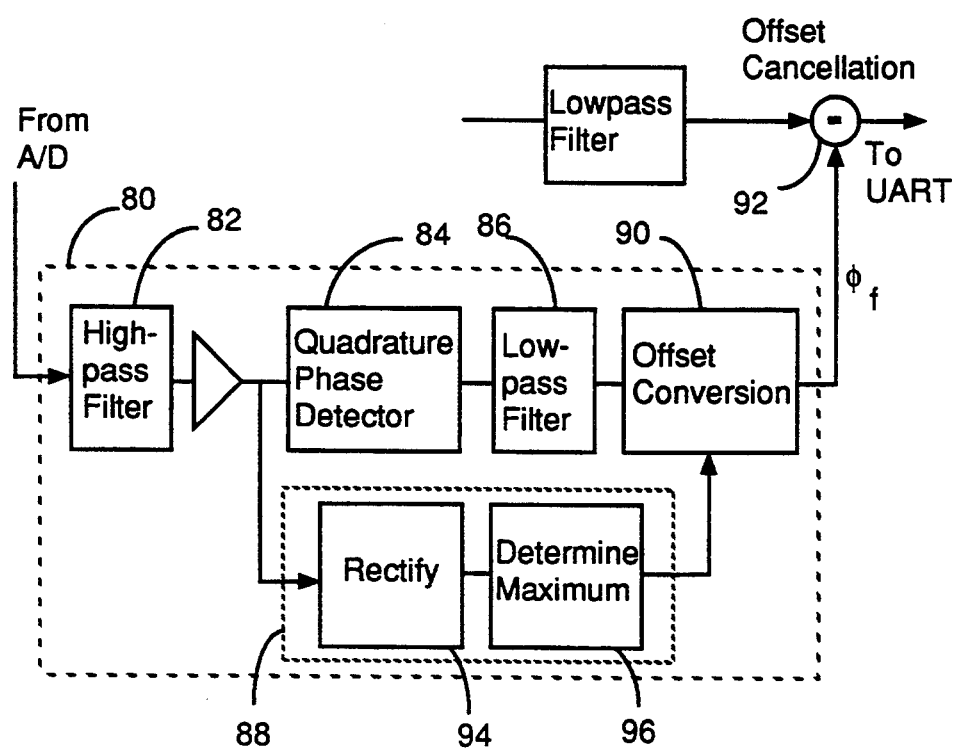
FIG. 5 is a functional block diagram of an off-hook offset estimation circuit according to yet another embodiment of the present invention.

FIG. 5 illustrates the implementation of the offset cancellation feature which is in effect during off-hook transmission. The off-hook offset estimate block 80 includes a highpass filter 82, a quadrature phase detector 84, and a lowpass filter 86, all of which are common to those of the on-hook offset estimate block described above. Therefore they are also the same as those used in the demodulator. In fact, like the demodulator, the offset estimate blocks 50 and 80 are also made on an ASIC. Because both the on-hook and off-hook offset estimate blocks do not operate at the same time, common components can be shared using different software. The off-hook offset esimate block 80 includes an amplitude estimate block 88 and an offset conversion block 90, the latter of which produces an off-hook offset signal $\phi_f$ after proper conversion in response to the amplitude estimate block 88. The figure also includes an offset cancellation block which is an adder 92.

The amplitude estimate block 88 obtains the level of the alert signal and includes a rectification 94 and a maximum detection 96. It should be noted that two 16-bit amplitude estimates are required; one measured during on-hook transmission, the other during off-hook transmission. Depending upon the current transmission mode, the appropriate amplitude estimate should be updated. These values are required to estimate the off-hook offset. The rectification 94 is simply the absolute value of the input. At the start of transmission, the maximum detection 96 should be reset to zero. The maximum is then determined by comparing the current rectified input with the current maximum.

As mentioned earlier, during on-hook transmission, the alert signal begins after the 300-bit channel seizure sequence has been transmitted. Assuming the transmission rate is 1200 Baud and the worst-case sampling rate is 6868 Hz, the alert signal will begin 1717 samples after on-hook transmission began. The alert signal is guaranteed to number at least 70 bits, which corresponds to 392 samples, assuming the worst-case sampling rate is equal to 6732 Hz. During off-hook transmission, the alert signal begins within 300 ms of the CPE acknowledgment and is of the same duration as in on-hook transmission. The offset estimation in off-hook transmission is conducted during this alert signal.

Off-Hook Offset $\phi_f$ Estimation

Without the channel seizure signal, the estimation of the off-hook offset $\phi_f$ is more involved than in the on-hook case. Two embodiments are described here, one requiring that the on-hook offset $\phi_n$ be previously estimated (from a previous on-hook transmission), the other having no such requirement. Both embodiments require that the alert signal amplitude, either on-hook or off-hook, be previously measured. The measurement of the alert signal amplitude has been described above in connection with the amplitude estimate block 88 in FIG. 5.

Let $A_{1n}$ and $A_{0n}$ denote the levels of the mark and space signaling tones before gain adjustment during on-hook transmission, while $A_{1f}$ and $A_{0f}$ denote the levels of the mark and space signaling tones before gain adjustment during off-hook transmission. Also, let $G=2^n$ be the value in the gain adjustment block, and let K be the product of the DC gain and the magnitude response at 600 Hz of the lowpass filter (which is approximately 13.37 dB). Given this notation, the on-hook and off-hook offsets may be approximated as described in the expressions below:

$$\phi_n \approx \frac{KG^2}{4}(A_{1n}^2 - A_{0n}^2)\cos\omega$$

and $$\phi_f \approx \frac{K(2G)^2}{4}(A_{1f}^2 - A_{0f}^2)\cos\omega$$

$$= KG^2(A_{1f}^2 - A_{0f}^2)\cos\omega$$

According to one embodiment, $\phi_f$ is computed by assuming that $\phi_n$ has previously been computed during an on-hook transmission. The basic assumption of this embodiment is that the off-hook signal levels (before the gain adjustment) are directly proportional to their on-hook counterparts so that $A_{1f}=k_1 A_{1n}$ and $A_{0f}=k_0 A_{0n}$. Substituting these approximations into the expression for $\phi_f$ yields $$\phi_f \approx KG^2(k_1^2 A_{1n}^2 - k_0^2 A_{0n}^2)\cos\omega$$

$$= KG^2(k_0^2 A_{1n}^2 + (k_1^2 - k_0^2)A_{1n}^2 - k_0^2 A_{0n}^2)\cos\omega$$

$$= KG^2 k_0^2(A_{1n}^2 - A_{0n}^2)\cos\omega + KG^2 A_{1n}^2(k_1^2 - k_0^2)\cos\omega$$

Therefore, the off-hook offset $\phi_f$ is determined by simple scaling of the on-hook offset $\phi_n$ and adding a correction factor proportional to the square of the on-hook mark signal level $A_{1n}$. The table below summarizes the nominal normalized digital levels expected at the quadrature phase detector input.

| Loop Length (kFt) | On-Hook $A_{1n}$ | On-Hook $A_{0n}$ | Off-Hook $A_{1f}$ | Off-Hook $A_{0f}$ | $k_1 = A_{1f}/A_{1n}$ | $k_0 = A_{0f}/A_{0n}$ |
|---|---|---|---|---|---|---|
| 0  | 0.0824 | 0.1803 | 0.0391 | 0.0858 | 0.4740 | 0.4762 |
| 3  | 0.0700 | 0.1365 | 0.0304 | 0.0647 | 0.4338 | 0.4740 |
| 6  | 0.0699 | 0.1169 | 0.0271 | 0.0554 | 0.3872 | 0.4740 |
| 9  | 0.0584 | 0.0832 | 0.0217 | 0.0394 | 0.3719 | 0.4740 |
| 12 | 0.0512 | 0.0693 | 0.0195 | 0.0329 | 0.3810 | 0.4740 |
| 15 | 0.0455 | 0.0575 | 0.0174 | 0.0272 | 0.3831 | 0.4740 |
| 18 | 0.0354 | 0.0394 | 0.0139 | 0.0187 | 0.3923 | 0.4740 |
| 21 | 0.0251 | 0.0270 | 0.0109 | 0.0128 | 0.4359 | 0.4740 |

Based upon values in the table above, the approximations $k_0 \approx 0.4743$ and $k_1 \approx 0.4074$ are appropriate. This would yield the following expression for $\phi_f$:

$$\phi_f \approx 4k_0^2 \phi_n + KG^2 A_{1n}^2 (k_1^2 - k_0^2)\cos\omega$$

$$= 4(0.4743)^2 \phi_n + G^2 A_{1n}^2 10^{(\frac{13.73}{20})} ((0.4074)^2 -$$

$$(0.4743)^2)\cos\left(2\pi \frac{1200}{6800}\right)$$

$$= 0.89984 \phi_n - 0.12255 G^2 A_{1n}^2$$

However, since $k_0$ and $k_1$ are subject to revision, they should be implicitly stored in the EEPROM parameters $c_0$, $c_1$ and $N$ as described in the following equation:

$$\phi_f \approx 2^N [c_0 \phi_n + c_1 G^2 A_{1n}^2]$$

The non-negative four-bit parameter $N$ ensures that the 16-bit parameters $c_0$ and $c_1$ are strictly less than unity and therefore representable. The initial values for $k_0$ and $k_1$ correspond to $N=0$, $c_0=0.89984$ and $c_1=-0.12255$.

According to another embodiment, $\phi_f$ is computed without knowledge of $\phi_n$, but this embodiment requires that the off-hook mark signal level $A_{1f}$ be measured. This approach assumes the off-hook space level $A_{0f}$ can be adequately estimated given the off-hook mark level $A_{1f}$. Assume that $A_{0f}$ may be linearly related to $A_{1f}$ so that $$A_{0f} \approx m A_{1f} + b$$

Given such linear relationship, it is possible to express $\phi_f$ as shown below.

$$\phi_f \approx \frac{K(2G)^2}{4} (A_{1f}^2 - A_{0f}^2)\cos\omega$$

$$= KG^2 (A_{1f}^2 - (mA_{1f} + b)^2)\cos\omega$$

$$= KG^2 ((1 - m^2)A_{1f}^2 - 2mbA_{1f} - b^2)\cos\omega$$

Figure 6:
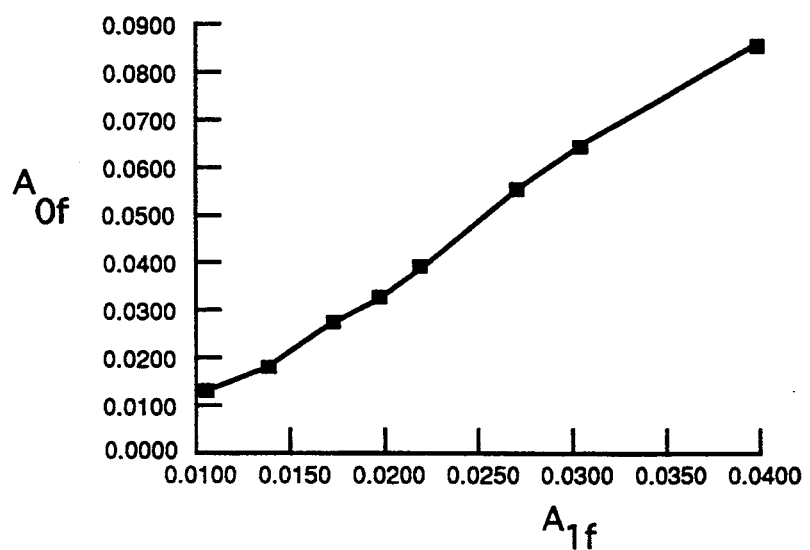
FIG. 6 is a graph showing the amplitudes of detected mark and space signals during off-hook transmission.

Using the nominal values for expected FSK receive levels from the table above, $A_{0f}$ is plotted as a function of $A_{1f}$ in FIG. 6.

Based upon the graph in FIG. 6, m is approximately 2.68141 and b is approximately −0.0182. Since m and b are subject to revision, they too should be stored in EEPROM in a manner analogous to the previous embodiment. Given that the embodiments are never used simultaneously, it is possible to reuse the EEPROM from the embodiment described earlier. The m and b parameters are implicitly stored in the EEPROM parameters $c_0$, $c_1$, $c_2$ and $N$ as described in the following equation:

$$\phi_f = 2^N G^2 (c_2 A_{1f}^2 + c_1 A_{1f} + c_0)$$

The non-negative four-bit parameter $N$ ensures that the 16-bit parameters $c_0$, $c_1$, and $c_2$ are strictly less than unity and therefore representable. The initial values for m and b correspond to $N=4$, $c_0=-0.00004301$, $c_1=0.01267$ and $c_2=-0.8038$.

What is claimed is:

1. A digital FSK demodulator for an FSK signal which consists of a series of mark and space tones and is composed of a message signal and an alert signal, the alert signal consisting of a substantial number of continuous bits of mark tone and preceding the message signal, comprising:
   a quadrature demodulator for digitally detecting the FSK signal to generate a detected FSK signal;
   an offset estimate means including a rectification means and a maximum detector for measuring the amplitude of the alert signal, and an offset conversion means for converting the amplitude by preset factors to generate an offset signal indicative of the offset in the detected FSK signal; and
   means for applying the offset signal to the quadrature demodulator to compensate the offset in the detected FSK signal.

2. The digital FSK demodulator according to claim 1, wherein the quadrature demodulator comprises a highpass filter to receive the FSK signal, a gain adjustment means, a quadrature phase detector and a lowpass filter, all connected in series in the listed order.

3. The digital FSK demodulator according to claim 1, wherein the offset estimate means further includes a highpass filter, a quadrature phase detector, and a lowpass filter, all connected in series in the listed order.

4. The digital FSK demodulator according to claim 1 wherein the FSK signal further contains a channel seizure signal preceding the alert signal and consisting of a substantial number of continuous bits of alternating space and mark tones, and the offset estimate means further comprises a rectification means and a maximum detector for measuring the amplitudes of the channel seizure signal, and an offset conversion means for converting the amplitude by preset factors to generate the offset signal indicative of the offset.

5. The digital FSK demodulator according to claim 4; wherein the offset estimate means includes a highpass filter, a quadrature phase detector and a lowpass filter, all connected in series in the listed order.

* * * * *